No. 851,004. PATENTED APR. 23, 1907.
B. M. W. HANSON.
MEANS FOR PROTECTING DRIVING PULLEYS.
APPLICATION FILED SEPT. 8, 1905.
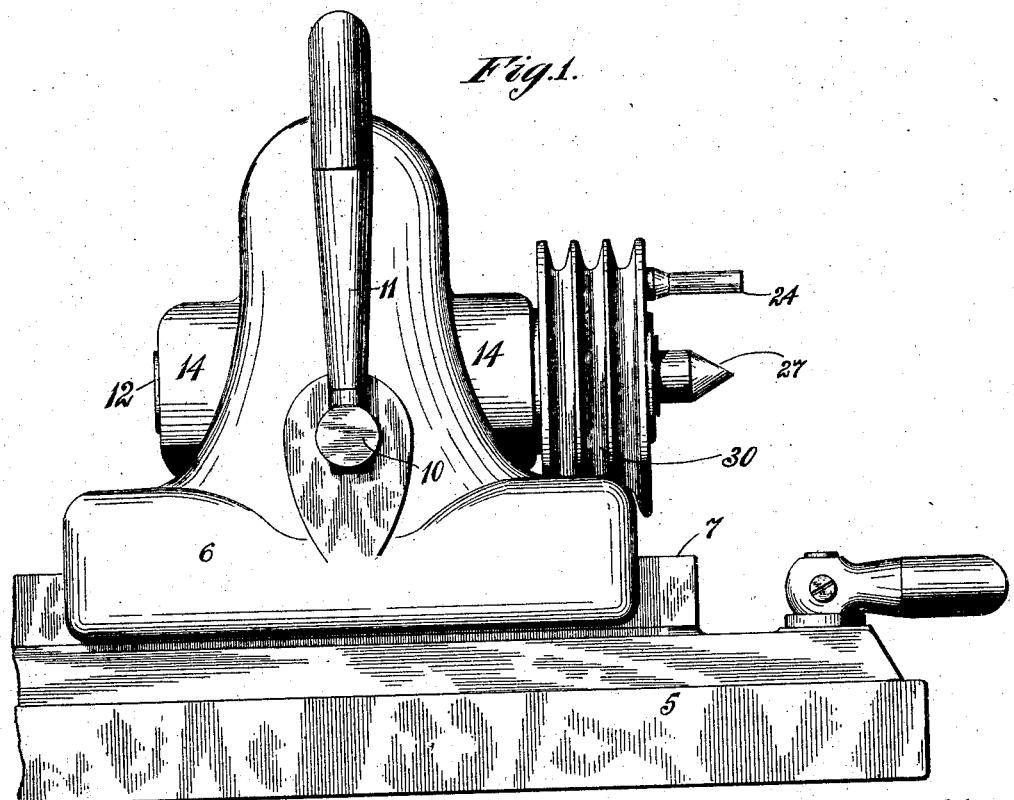
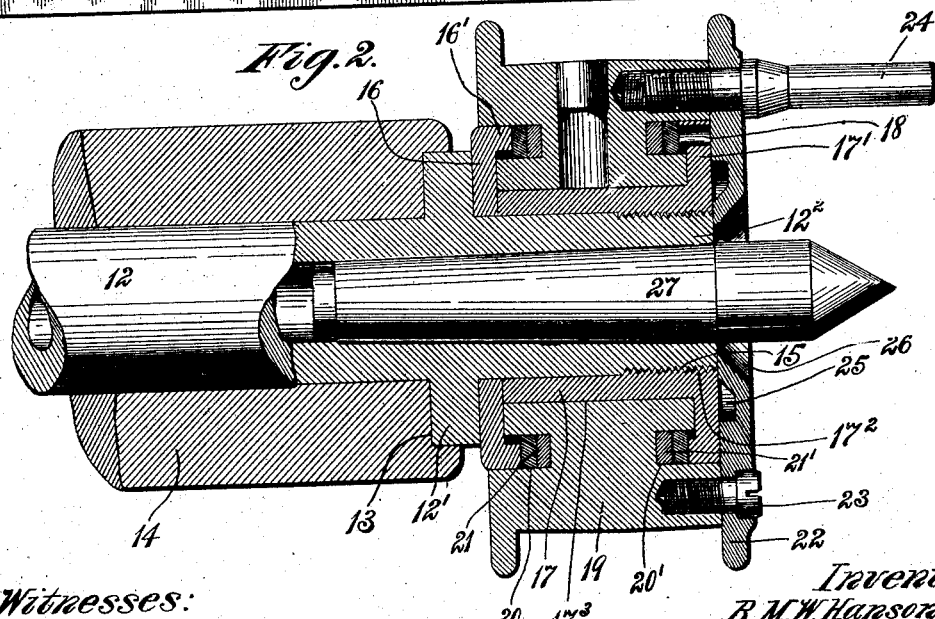
Witnesses:
S. S. Grotta.
H. E. Anderson.
Inventor:
B. M. W. Hanson,
By his Attorney,

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

MEANS FOR PROTECTING DRIVING-PULLEYS.

No. 851,004.      Specification of Letters Patent.      Patented April 23, 1907.

Application filed September 8, 1905. Serial No. 277,551.

*To all whom it may concern:*

Be it known that I, BENGT M. W. HANSON, a citizen of Sweden, having declared my intention of becoming a citizen of the United States, residing at Hartford, in the county of Hartford and State of Connecticut, have invented certain new and useful Improvements in Means for Protecting Driving-Pulleys, &c., of which the following is a specification.

This invention relates to the head-stocks of grinding and analogous machines in which the pulley or other driven element is liable to receive detritus from the grinding-wheel, milling-tool, or other implement employed for reducing purposes and in which the work-driving element is supported for rotation on a fixed sleeve or bushing inserted in the head-stock and carries a device for engaging a dog secured to the work.

My invention has for its main object the provision of improved means for protecting the driven element in such a way that it will be impossible for foreign matter, such as refuse from the reducing-tool and the work, to enter the bearing and other parts.

A further object of the invention is the provision of constructional details, which will be hereinafter described.

Other objects of the invention will be hereinafter set forth.

In the accompanying drawings, Figure 1 is a side elevation of the headstock of a metal-reducing machine to which my invention may be applied. Fig. 2 is a longitudinal vertical section showing a single belt-pulley in lieu of the multiple belt-pulley.

Like numerals designate similar parts throughout the several views.

Referring to the drawings, the numeral 5 designates part of the reciprocatory carriage of a machine, and 6 a head-stock adjustably secured to a table 7 thereof in any desired way. This head-stock is bored longitudinally to receive a sleeve or tubular spindle 12, having a circular flange 12', which enters a rabbet 13 in the tubular bearings 14. At its inner end $12^2$ the sleeve 12 is externally threaded at 15, for a purpose hereinafter described.

Designated by 16 is a perforated disk or washer, having an inwardly-projecting flange 16', said disk being slipped upon the part $12^2$ of sleeve 12 and bearing at its back against the flange 12', as shown in Fig. 2.

A bushing 17, flanged at 17', where it is provided with spanner-holes 18, is internally threaded at $17^2$ to engage the thread 15 of the sleeve 12, and this bushing is formed with a smooth periphery $17^3$, which serves as a bearing-surface for a pulley or other driven element 19 now to be described. This driven element is formed with circular grooves 20 20' in each of its ends, and in the chambers formed by these grooves are placed washers or rings 21 21', of felt or other suitable material, the groove 20 receiving the flange 16' of disk 16 and the groove 20' the flange 17' of bushing 17, said flanges bearing against the outer washers, and in this way keeping the joints tight, as will be readily understood.

Designated by 22 is a disk, which is secured to the pulley 19 by screw 23 and the dog-engaging pin 24, and said disk serves to cover and protect all the joints of the front of the pulley and also to serve as one of the pulley-flanges. To avoid unnecessary bearing-surface, the inner side of the disk is grooved at 25 opposite the flange 17', and it is provided with a flared opening 26, where it surrounds the fixed center, the latter being designated by 27.

In Fig. 1 a grooved pulley 30 is shown; but with this exception the parts are the same as in Fig. 2.

From what has been stated it will be seen that the parts are fully protected against the entrance of water, detritus, or foreign matter of any kind and that the pulley will run true and evenly, thus imparting a corresponding movement to the article it drives. Furthermore, the invention is not limited to any particular use, for it may be employed to protect either rotary driving or driven elements in various arts.

Having thus described my invention, what I claim is—

1. The combination, with a flanged stationary support, of a flanged bushing in removable connection with said support; a member rotatable on said bushing; a disk located between the end of the bushing and the flange of the support, said disk protecting one side of the rotatable member; and a disk secured to the other side of said rotatable member, and serving to protect the support and bushing.

2. The combination, with a flanged stationary support, of an inwardly-flanged disk loosely mounted on said support; a rotatable member having circular grooves in its sides; packing in said grooves; a flanged bushing secured to the support, and upon which the rotatable member is mounted; and a disk secured to said rotatable member and protecting the joint between the bushing and the support.

3. The combination, with a support having a circumferential flange, of a flanged disk mounted on said support and the back of which bears against said flange; a rotatable member having circumferential grooves in its sides; packing in each of said grooves; a bushing threaded upon the support, and having an inward flange at its outer end; a disk having a portion protecting the joint between the bushing and support; and means for securing said disk to the rotatable member.

4. The combination, with a support having a circumferential flange, of an inwardly-flanged disk sleeved upon said support; a bushing threaded upon the support, and bearing against the disk, said bushing being flanged at its outer ends; a rotatable member sleeved upon the bushing between the flange thereof and the disk, and having grooves or chambers in its sides; packing-washers in said grooves or chambers; and means secured to said rotatable member, and serving to protect the joints between the bushing and the rotatable member and between the bushing and the support.

5. The combination, with a tubular support having a circumferential flange, of a flanged disk sleeved upon said support, and bearing against said circumferential flange; a bushing in threaded engagement with the support; a pulley mounted on said bushing and having chambers in its sides; packing-washers in said chambers and in engagement with the flanges of the disk; a disk secured to the pulley, and constituting one flange thereof, said disk serving to close the joints between the bushing and said pulley.

6. The combination, with a stock having a bearing, of a flanged sleeve mounted in said bearing; a flanged disk carried by the sleeve; a rotatable member having a chamber in its side for the reception of the flange of the disk; a bushing rigid with the sleeve, and upon which the rotatable member is mounted; and means for protecting the side of the rotatable member and bushing at the side opposite that where the flanged disk is located.

7. The combination, with a stock having an overhang provided with a bearing rabbeted at its forward end, of a tubular sleeve provided with a flange which is inserted in the rabbet of the bearing; a flanged disk mounted on the sleeve, and bearing against the flange thereof; a bushing secured to the sleeve, and the end of which is in contact with said disk, said bushing having a flange at its opposite extremity; a rotatable member sleeved upon the bushing, and having chambers in its side for the reception of flanges of the disk and bushing; packing-washers located in said chambers; and a disk secured to the front of the rotatable member, and serving to protect the joints between said member and the flange-bushing, and between the flange-bushing and the sleeve.

In testimony whereof I affix my signature in presence of two witnesses.

BENGT M. W. HANSON.

Witnesses:
  LAURA A. KROHER,
  CHAS. MUNGER.